United States Patent [19]

Withers

[11] 4,324,606

[45] Apr. 13, 1982

[54] PROCESS FOR FORMING A REINFORCED MEMBRANE

[75] Inventor: Michael S. Withers, Landenberg, Pa.

[73] Assignee: E. I. Du Pont de Nemours and Company, Wilmington, Del.

[21] Appl. No.: 121,461

[22] Filed: Feb. 14, 1980

Related U.S. Application Data

[63] Continuation-in-part of Ser. No. 107,521, Dec. 27, 1979, abandoned.

[51] Int. Cl.$^3$ .............................................. B29C 19/02
[52] U.S. Cl. ............................... 156/272.2; 156/286; 156/308.2; 156/313; 156/324; 428/192; 428/247
[58] Field of Search ..................... 156/272, 286, 308.2, 156/313, 324

[56] References Cited

U.S. PATENT DOCUMENTS

| | | | |
|---|---|---|---|
| 3,770,567 | 11/1973 | Grot | 428/286 |
| 3,849,243 | 11/1974 | Grot | 428/286 |
| 3,933,552 | 1/1976 | Shumaker | 156/286 |
| 4,040,888 | 8/1974 | Soska et al. | 156/286 |

FOREIGN PATENT DOCUMENTS 1167005  4/1964  Fed. Rep. of Germany .

*Primary Examiner*—James J. Bell

[57] ABSTRACT

A process and apparatus for continuously forming a reinforced membrane of fluorinated polymers containing sulfonyl and/or carboxyl groups in melt-fabricable form and, after hydrolysis, the corresponding membrane in ion exchange form. The membrane thus formed has exceptional uniformity, and this membrane so made, when used as the membrane which separates the compartments of a chloralkali cell, offers the advantages of low operating voltage, low power consumption and high current efficiency, and a long useful life without rupture.

10 Claims, 5 Drawing Figures

PROCESS FOR FORMING A REINFORCED MEMBRANE

CROSS-REFERENCE TO RELATED APPLICATION

This application is a continuation-in-part of my prior copending application U.S. Ser. No. 107,521 filed Dec. 27, 1979 now abandoned.

BACKGROUND OF THE INVENTION

This invention relates to an improved cationic exchange membrane, a process for making that membrane, and apparatus which is used in the process. More particularly, the membrane is a fluorinated cation exchange membrane, one important use of which is to separate the anode and cathode compartments of a chloralkali cell.

Fluorinated polymers containing pendant side chains containing sulfonyl groups are now well-known, and their use as ion exchange membranes is also known. It is desirable to have an ion exchange membrane which is supported, i.e., which contains a material which imparts physical strength to the fluorinated polymer, so that the physical strength of the complete membrane construction is greater than that of a film of the fluorinated polymer. Heretofore, methods for supporting such membranes have not been adequate, for if films of desirable thickness were employed complete encapsulation of the support material was not effected, and if complete encapsulation of the support material were to be assured excessively thick films of fluorinated polymer were required. Such excessive film thickness not only increases the cost of the membrane, but is also reduces the usefulness of the membrane for ion exchange purposes because the increased thickness leads to higher operating voltage and higher power consumption. If the support material is not completely encapsulated, the membrane will leak or will in use ultimately rupture at the non-encapsulated points and will then leak, and thus its usefulness is impaired.

A method which has been proposed to overcome the above problems and deficiencies is that of U.S. Pat. No. 3,770,567 wherein a film of fluorinated polymer which contains pendant side chains containing —SO$_2$L groups, where L is F or Cl, is treated on one surface with an alkali metal hydroxide, an alkaline earth metal hydroxide or ammonium hydroxide, to form a hydrolyzed surface layer wherein the functional groups are in the —(SO$_3$)$_j$M form, where M is alkali metal, alkaline earth metal or ammonium, and j is the valence of M, followed by contacting the —SO$_2$L surface of the film with a support material, and applying a differential pressure to the contacted support material and the film, the pressure on the opposite surface of the support material from that which is contacting the fluorinated polymer being at least 5 inches (127 mm) of mercury less than the pressure on the surface of the fluorinated polymer film opposite to that contacting the support material, for a sufficient period of time to cause the support material which is in contact with said film to become completely encapsulated within the film of fluorinated polymer while heating the film and support material at a temperature of from 240°–320° C. The resulting laminate is then subjected to a second hydrolysis treatment with alkali metal hydroxide, alkaline earth metal hydroxide or ammonium hydroxide after which it is ready for use for ion exchange purposes. This method has the disadvantage of adding an additional processing step in the formation of the supported structure, and many additional hours of processing time are required to effect the surface hydrolysis step in the hydroxide treating bath used. Additionally this method cannot be used for fluorinated polymers which contain carboxylic functional groups because the hydrolysis step would lead to carboxylic acid groups or salts thereof, which easily decarboxylate at the temperatures employed in forming the supported construction.

It is a principal object of the invention to provide novel web supported membranes of exceptional uniformity. In the novel web reinforced membranes the sulfonyl and carboxyl groups can be either in melt fabricable form, or, after hydrolysis or other suitable chemical reaction, can be in ion exchange form.

It is another object of this invention to provide a process for forming a supported structure of fluorinated polymers which contain pendant side chains containing either sulfonyl groups or carboxyl groups or both, which method leads to a completely encapsulated supported structure, and which eliminates the necessity for a surface hydrolysis step.

It is a further object to provide apparatus adapted for carrying out the process of the invention specified immediately above.

Other objects will be apparent from the continuing description.

SUMMARY OF THE INVENTION

According to the present invention, there is provided a reinforced membrane which consists essentially of at least two layers of melt fabricable fluorinated polymer which contains side chains containing sulfonyl and/or carboxyl groups in melt fabricable form, and a woven reinforcing fabric comprising warp and fill strands, there being at least one layer of a said fluorinated polymer on each side of said reinforcing fabric, the warp and fill strands of said reinforcing fabric defining windows between said strands, each layer of fluorinated polymer in at least 70% of the area in each of at least 90% of said windows being of uniform thickness within plus or minus 10%.

There is also provided according to the invention reinforced membranes in ion exchange form made by hydrolyzing or otherwise chemically modifying such melt fabricable membranes.

There is additionally provided according to the invention a process for continuously forming a reinforced membrane comprising (1) continuously bringing at least two films of melt-fabricable fluorinated polymer which contain side chains containing sulfonyl and/or carboxyl functional groups in melt fabricable form and a web of reinforcing material into face-to-face contact such that proximate surfaces of two of said films contact opposite planar surfaces of said web, and moving the resulting combination of said films and said web vertically, unsupported except at two opposite edges thereof, (2) removing air from between said films at the two opposite edge portions thereof, (3) applying heat to the two outermost opposite planar film surfaces, first in the center portions thereof and progressively moving toward and including the edge portions thereof, and (4) cooling the resulting reinforced membrane.

There is further provided according to the invention apparatus for making a reinforced membrane, comprising, (1) a frame, and mounted on said frame, (2) means for guiding at least two continuous webs of film and a continuous web of reinforcing material into face-to-face contact such that proximate surfaces of two of said webs of film contact opposite sides of said web of reinforcing material, (3) two sets of flexible endless belts which cooperate to engage opposite sides of the resulting assembly of said webs at the edge portions thereof and to transport said assembly, each set consisting of two belts, one belt of each set having a series of perforations along its entire length, each set of belts extending beyond an edge of said assembly, and guide means for said belts, (4) vacuum means including two vacuum manifolds, one manifold adjacent each said perforated belt, for removing air from between said films of said assembly at the edge portions thereof through said perforations, (5) two banks of heaters, one bank adjacent each exposed film surface, each bank consisting of a plurality of heaters disposed for heating first the center portion of said assembly and then progressively toward and including the edges thereof as said assembly is transported therebetween, to fuse said assembly into a reinforced membrane, (6) means for guiding said assembly between said banks of heaters, (7) a wind-up for collecting said reinforced membrane, and (8) means for driving said wind-up.

DETAILED DESCRIPTION OF THE INVENTION

Figure 1:
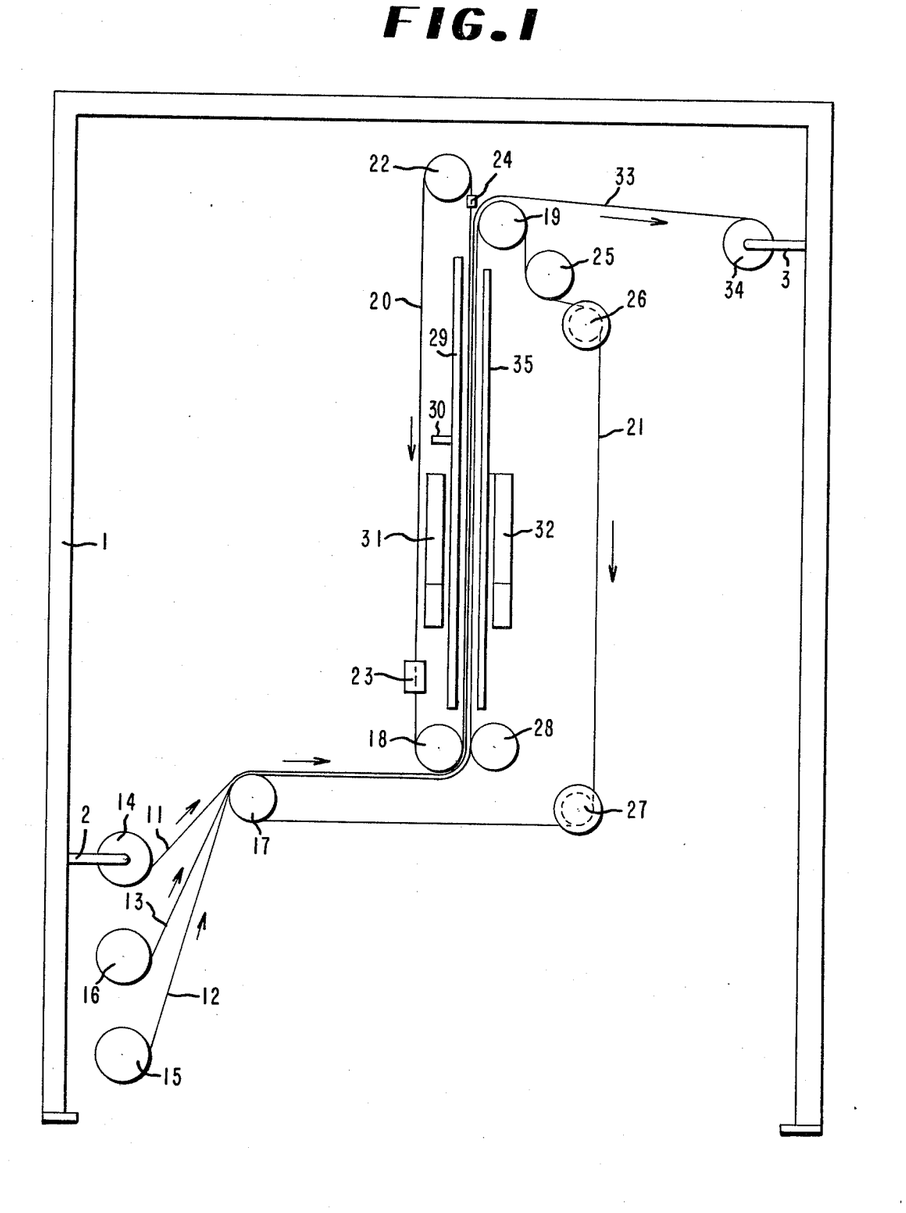
FIG. 1 depicts schematically a side view of the apparatus of the invention.

Referring first to FIG. 1, it should be understood that the various elements of the apparatus of the invention are joined either directly or indirectly to a frame 1 by means of various supports, of which supports 2 and 3 are typical, the remaining supports not being shown for simplicity.

Melt fabricable films 11 and 12 of fluorinated polymer containing sulfonyl and/or carboxyl groups, to be described more fully below, and a web of reinforcing material 13, also to be described more fully below, are unwound from supply rolls 14, 15 and 16, respectively, in the direction of the arrows shown. Films 11 and 12 and web 13 are brought together over guide roll 17, and further guided through the apparatus around guide rolls 18 and 19.

Flexible belts 20 and 21 cooperate to contact opposite sides of one edge portion of the assembly of films 11 and 12 and web 13. Belts 20 and 21 are suitably made of a thin impervious material such as stainless steel about 5 to 20 mils (0.13 to 0.5 mm) thick. Belts 20 and 21 move in the direction of the arrows shown.

Belt 20 is guided in a path around rolls 18 and 22. Roll 22 is mounted so as to be movable vertically by means of air-actuated cylinders, not shown. In this way roll 22 presses against belt 20 to create a positive tension which prevents the belt from slipping on the rolls it contacts.

Belt 20 is restrained from wandering laterally along the indicated rolls by use of two guide blocks 23 and 24 within which it passes just before it contacts rolls 18 and 22, respectively. Each guide block is fabricated from two members (not separately shown) held together by screws. The first member is in the shape of a rectangular solid having machined in one face a shallow depression, about 0.25 mm (10 mils) deep for a belt 0.2 mm (8 mils) thick, and about 1/16 inch (about 1.5 mm) wider than the width of belt 20, and the second member in the form of a rectangular solid is secured by screws to the first member over the machined depression to form a slot through which belt 20 passes. The second member of the guide block is placed in position only after endless belt 20 has been positioned in the machined depression. Guide blocks 23 and 24 are suitably fabricated from aromatic polyimide resin filled with graphite as is disclosed in U.S. Pat. No. 3,179,631.

Belt 20 contains a series of perforations along its entire length, not shown in FIG. 1, but which will be more fully explained below.

Belt 21 is guided in a path around rolls 17, 18, 19, 25, 26 and 27. Belt 21 is restrained from wandering laterally along those rolls by use of flanges between which belt 21 runs on rolls 26 and 27.

The shaft of roll 26 is mounted with a screw adjustment for moving roll 26 toward and away from belt 21 to permit increasing or decreasing the tension on belt 21. In this way the tension on belt 21 can be adjusted so that it will not slip.

A second set of belts, not shown in FIG. 1 but identical to belts 20 and 21, similarly grips the second edge portion of the assembly of films 11 and 12 and web 13.

Roll 28 is a resilient rubber roll which is urged by air actuated cylinders toward roll 18 to press belts 20 and 21, films 11 and 12, and web 13 into intimate contact and against roll 18.

A vacuum manifold 29, whose operation will be more fully explained below, is positioned adjacent perforated belt 20. Pipe 30 serves to join vacuum manifold 29 to a vacuum source not shown. A second vacuum manifold, not shown in FIG. 1 but identical to vacuum manifold 29, is positioned adjacent to the second perforated belt referred to above but also not shown in FIG. 1.

A sealing shoe 35 to be described in detail below presses against belt 21 and urges belts 20 and 21 films 11 and 12 and web 13 toward vacuum manifold 29. A similar sealing shoe is used in cooperation with the second set of belts not shown in this view.

Two banks of heaters (not shown in FIG. 1) contained within housings 31 and 32 are positioned on opposite sides of the assembly of films 11 and 12 and web 13. The heaters serve to soften films 11 and 12 sufficiently to permit the assembly of films 11 and 12 and web 13 to be fused into a membrane. The membrane 33 thus formed is collected on wind-up 34.

Wind-up 34 and rolls 17 and 18 are driven. They provide the driving force for moving the membrane and assembly of films 11 and 12 and web 13 through the apparatus. The remaining rolls in the apparatus all can be idler rolls.

Rolls 17 and 18 are suitably covered with a textured surface such as a fine emery cloth. This provides a high enough coefficient of friction of the roll against films 11 and 12 to prevent the films and also belts 20 and 21 from slipping against these driven rolls.

Certain elements in FIG. 1 are drawn as not in contact with one another for clarity in showing them, whereas it should be understood that they are in contact during operation. Thus, in FIG. 1, vacuum manifold is shown as not in contact with belt 20, the latter is shown as not in contact with the assembly of webs 11, 12 and 13, the latter is shown as not in contact with belt 21, and the latter is shown as not in contact with sealing shoe 35, whereas during operation these pairs of elements are in fact in contact.

Figure 2:
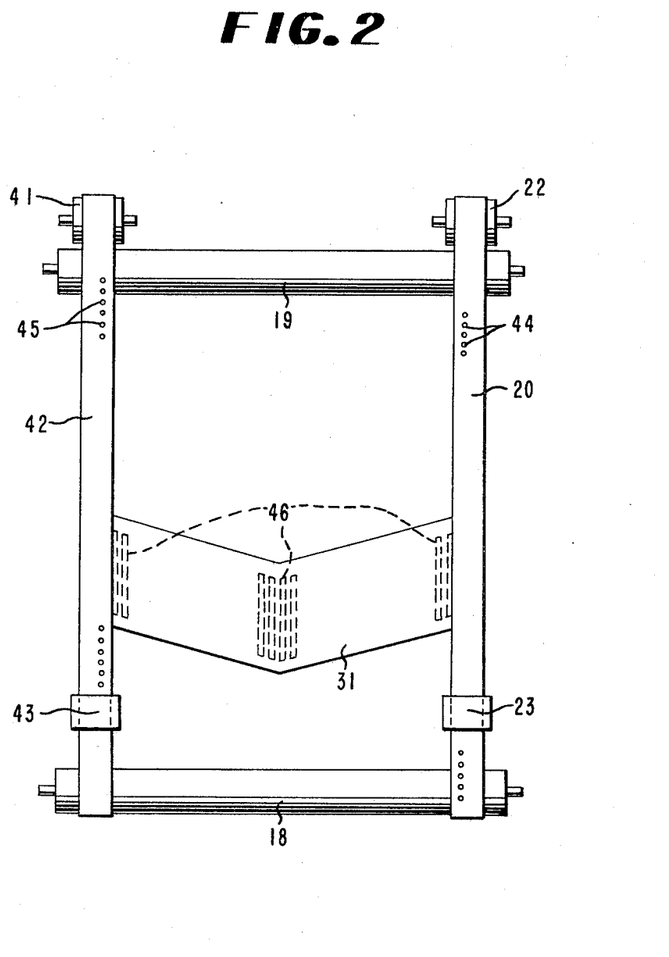
FIG. 2 depicts schematically a front view of a portion of the apparatus of the invention.

In FIG. 2, a partial front view of the apparatus, are seen rolls 18, 19 and 22, with belt 20 shown passing over rolls 18 and 22 and being restrained from lateral movement by guide block 23. A second similar belt 42, not seen in FIG. 1, passes over rolls 18 and 41, and is also seen in this view. Belt 42 also is restrained from lateral movement by a guide block 42. The second guide block 24 for belt 20, and a similar second guide block for belt 42 are not shown in this view.

Roll 41 is mounted to be movable vertically in the same manner as is roll 22. Both rolls 22 and 41 are made of resilient rubber.

Belt 20 has a series of perforations 44 along the entire length thereof, only some of which are shown in FIG. 2. Similarly, belt 42 has a series of perforations 45 along the entire length thereof, only some of which are shown in FIG. 2. Housing 31 contains a bank of heating elements 46, which typically may be radiant or infrared heating elements. Housing 32, not shown in FIG. 2, contains a similar bank of heating elements. In the apparatus and process here depicted, the assembly of films and reinforcing material to be fabricated into a membrane is transported upwardly from roll 18 and around roll 19. Heater elements 46 are arrayed in a chevron-shaped array for the purpose of first heating the center portion of the assembly and then progressively laterally in both directions to and including the edge portions of the assembly, and it is for this reason that the center of the chevron-shaped array points downward. In this manner, entrapment of air bubbles between the films as they are laminated is less likely to occur.

Figure 3:
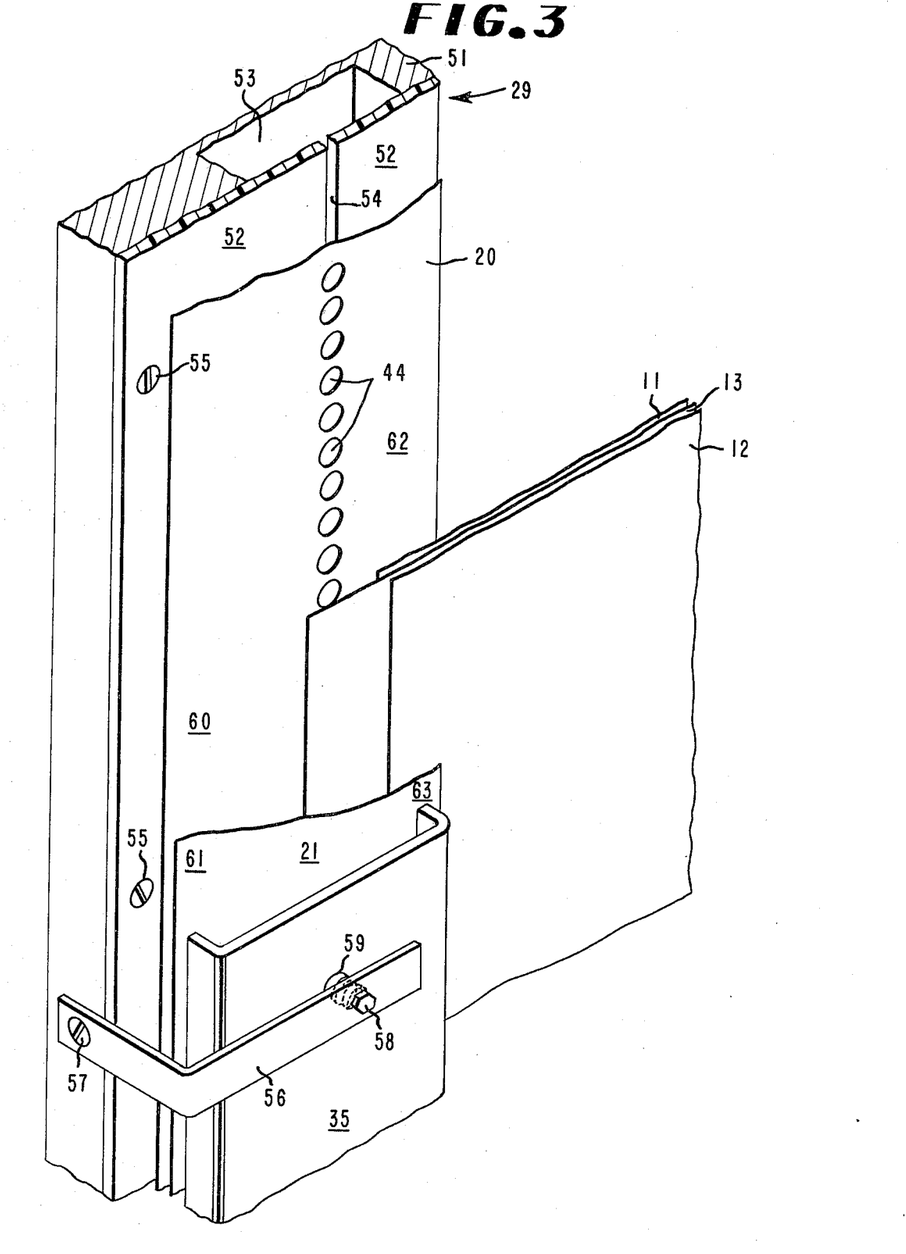
FIG. 3 is a pictorial view of a detail at one edge portion of the apparatus of the invention.

In the pictorial view of FIG. 3 is found a view of belts 20 and 21 and an edge of films 11 and 12 and reinforcing material 13, with each element in turn broken away so as to reveal the relationship of these elements to one another. As seen in FIG. 3, an edge of each of films 11 and 12 and of reinforcing material 13 extends between belts 20 and 21. Belts 20 and 21 are suitably of the same width, typically 5–15 centimeters (2–6 inches) and are positioned to be in register with one another. As indicated above, belt 20 has a series of perforations 44 along the entire length thereof.

The combination of belts 20 and 21 and assembly of films 11 and 12 and reinforcing material 13 moves upwardly, with belt 20 moving slidably against and in contact with vacuum manifold 29.

Vacuum manifold 29 comprises a body 51 and a face plate 52. Body 51 is fabricated to have a wide deep recess along most of its length, except for the extreme end portions thereof which are not recessed, the recess becoming interior chamber 53 of the manifold, and is suitably made of a metal such as aluminum. Face plate 52 is fabricated to have a slot 54 along most of its length, except for the extreme end portions thereof which are not slotted, the slot communicating with chamber 53, and is suitably made of a graphite-filled phenolic resin so that belt 20 will easily slide against it even when drawn against it by vacuum and pressed against it by sealing shoe 35. The body 51 and face plate 52 are held together by screws 55, and sealed together with a silicone rubber cement. Interior chamber 53 is connected to vacuum means, as was explained in relation to FIG. 1 above. Belt 20 and vacuum manifold 29 are so positioned that perforations 44 and slot 54 are in register with one another. Typically, perforations 44 are about 6 mm in diameter and slot 54 is about 3 mm wide. Sealing shoe 35 is urged against belt 21 by a series of spring-loaded brackets, of which bracket 56 is typical. Bracket 56 is secured to the body 51 of vacuum manifold 29 by a screw 57. Bracket 56 is linked to, but spaced apart from, sealing shoe 35 by a bolt 58 and nuts not shown. A spring 59 surrounding the shaft of bolt 58 urges sealing shoe 35 against belt 21.

In operation, when a vacuum is drawn in vacuum chamber 53, air is drawn through slot 54. This in turn draws belt 20 into contact with face plate 52 of vacuum manifold 29. As belt 20 moves upward, it moves in sliding contact with face plate 52. In turn, all of films 11 and 12, reinforcing material 13, and belt 21 are drawn into contact with one another and with belt 20. The outermost portions 60 and 61 of belts 20 and 21, respectively, form a temporary seal against one another. Similarly, film 11 forms a temporary seal against the inner portion 62 of belt 20, and film 12 forms a temporary seal against the inner portion 63 of belt 21. Residual air trapped between films 11 and 12 is then drawn from between them, between the strands of reinforcing material 13, and through perforations 44 and slot 54 into vacuum manifold 29. Sealing shoe 35 presses against the edge portions of belt 21 and thus aids in establishing and maintaining the temporary vacuum seals. In this way films 11 and 12 are brought into intimate contact with reinforcing material 13, and are sealed into intimate contact with it as the assembly of films and reinforcing material passes between the heaters.

Films 11 and 12 are suitably of the same width and are passed through the apparatus in register with one another. However, film 12 may be wider than film 11 without impairing the operation of the apparatus and removal of the entrapped air from between the films.

The web supported membranes of the invention are characterized by having exceptional uniformity. Woven reinforcing fabrics comprise warp and fill strands which meet at crossover points termed junctions, and which define openings between the strands termed windows. In the membranes of the invention each layer of fluorinated polymer in at least 70%, preferably 75%, of the area in each of at least 90%, preferably 95%, of the windows is of uniform thickness within plus or minus 10%, preferably plus or minus 5%. Additionally, it is preferred that the total thickness of fluorinated polymer which covers both sides of the strands is at least 80%, preferably 85%, of the average total thickness of the polymer in the portion of the windows which is uniform within plus or minus 10%.

Figure 4:
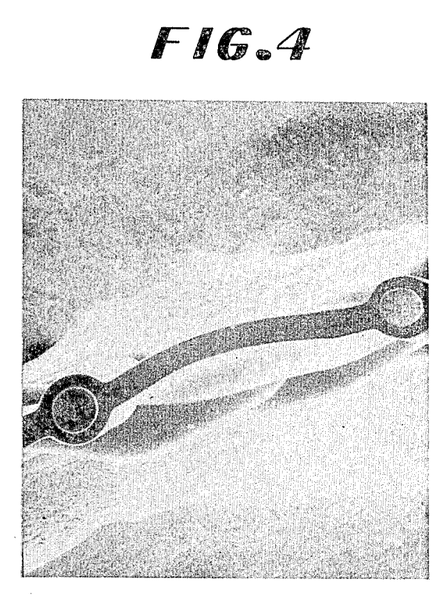
FIG. 4 is a photograph, at a magnification of 60, of a cross-section of a membrane of the invention, cut in a direction parallel to the machine direction of the lamination process.
Figure 5:
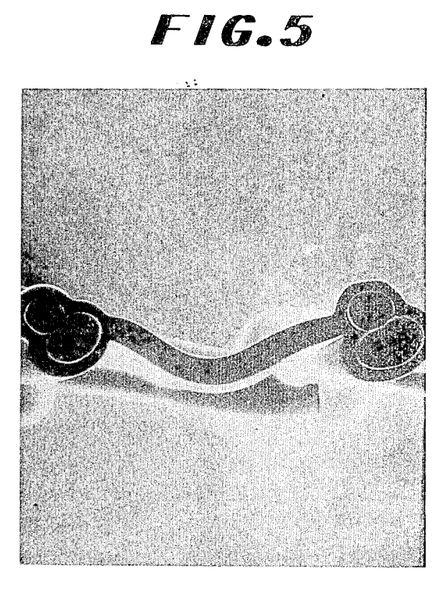
FIG. 5 is a photograph, at a magnification of 60, of a cross-section of the same membrane as in FIG. 4, but cut in a direction perpendicular to the machine direction of the lamination process.

FIGS. 4 and 5 are photographs at 60× magnification of cross-sections of a membrane of the invention cut in directions parallel and perpendicular, respectively, to the machine directions of the lamination process. The membrane was made by laminating a film 0.051 mm (2 mils) thick of a copolymer of perfluoro(3,6-dioxa-4-methyl-7-octenesulfonyl fluoride) and tetrafluoroethylene having an equivalent weight of 1100 to each side of a fabric of fluorocarbon polymer filaments (0.127 mm, or 5 mil, diameter) in a Leno weave having 68% open area. This membrane is similar to that first prepared in Example 1 below, before the ethylene diamine treatment of that example.

The membranes of the invention are prepared from component polymer films which have a thickness ranging from as low as 0.013 mm (0.5 mil) up to several mils. As the membrane will generally be prepared from two or three such polymer films, the thickness of polymer in the resulting membrane will generally lie in the range of about 0.025 to 0.25 mm (1 to 10 mils).

Membranes can be made using either the same or different thickness of polymer on each side of the reinforcing material. In some cases the polymer on one side of the reinforced material will be made up of layers of two different polymer films, which can be blocked together before the lamination process is carried out. During lamination the bank of heaters on one side of the assembly of webs to be laminated can be heated to a higher or lower temperature than the bank of heaters on the opposite side, or both banks of heaters can be heated to the same temperature.

When the same thickness of the same or similar polymer films are used on each side of the reinforcing material and the heaters are operated at the same temperature, the polymer films are drawn substantially equally into the window areas of the reinforcing material during fabrication, and the two opposite surfaces of the resulting membrane are therefore similarly contoured. When the heaters are operated at different temperatures, the film on the side heated to the lower temperature is less easily drawn into the window areas, so the contour of the surface of the resulting membrane on that side will be smoother or flatter than the contour on the opposite side which was heated to the higher temperature.

When different thicknesses of polymer film are used on opposite sides of the reinforcing material, and the heaters are operated at the same temperature, the side having the greater thickness of polymer will be less easily drawn into the window areas of the reinforcing material, and the surface of that side will have a smoother or flatter contour than the contour of the opposite side having a thinner layer of polymer. When different thicknesses of polymer are used on the two opposing sides of the reinforcing material and it is desired to have a membrane having approximately the same surface contour on each side, the bank of heaters on the side having the greater thickness of polymer can be heated to a somewhat higher temperature so as to permit the polymer on both sides of the reinforcing material to be equally drawn into the window areas.

Among the preferred membrane constructions are those having polymer with sulfonic functional groups on both sides of the reinforcing material, those having polymer with carboxylic functional groups on both sides of the reinforcing material, those having polymer with sulfonic functional groups on one side of the reinforcing material and carboxylic functional groups on the other side of the reinforcing material, and those having polymer with sulfonic functional groups on one side of the reinforcing material and a layer of polymer with sulfonic functional groups and also a layer of polymer with carboxylic functional groups on the other side of the reinforcing material such that the polymer with carboxylic functional groups constitutes the exposed surface layer.

A problem which is sometimes encountered with a chloralkali cell which employs a membrane to separate the anode and cathode compartments is gas blinding on the cathode side of the membrane. One of the advantages of the present invention is its ability to make membranes having a smoother or flatter surface on one side of the membrane as compared to the other side. A membrane prepared to have one relatively smooth or flat side can be positioned in a chloralkali cell such that the smoother side faces toward the cathode so as to alleviate the problem of entrapment of gas bubbles in recesses on the membrane surface facing the cathode. Membranes fabricated to have two different polymers on the two different surfaces, for example polymer having sulfonic acid or salt functional groups on one surface and polymer having sulfonamide functional groups or carboxylic functional groups on the other surface are generally positioned in a chloralkali cell with the latter surface facing toward the cathode, inasmuch as that polymer composition is more effective in suppressing back-migration of hydroxyl ion through the membrane. In such membranes it is therefore preferred that the membrane surface having carboxylic or sulfonamide functional groups have a flatter contour than the other surface.

The melt-fabricable polymer having sulfonyl functional groups is typically a polymer having a fluorinated hydrocarbon backbone chain to which are attached the functional groups or pendant side chains which in turn carry the functional groups. The pendant side chains can contain, for example, groups wherein $R_f$ is F, Cl, or a $C_1$ to $C_{10}$ perfluoroalkyl radical. Ordinarily, the functional group in the side chains of the polymer will be present in terminal groups.

Examples of fluorinated polymers of this kind are disclosed in U.S. Pat. Nos. 3,282,875, 3,560,568 and 3,718,627. More specifically, the polymers can be prepared from monomers which are fluorinated or fluorine substituted vinyl compounds. The polymers are made from at least two monomers, with at least one of the monomers coming from each of the two groups described below.

The first group is fluorinated vinyl compounds such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen.

The second group is the sulfonyl-containing monomers containing the precursor group wherein $R_f$ is as defined above. Additional examples can be represented by the general formula $CF_2=CF-T-CF_2SO_2F$ wherein T is a bifunctional fluorinated radical comprising 1 to 8 carbon atoms, and k is 0 or 1. Substituent atoms in T include fluorine, chlorine, or hydrogen, although generally hydrogen will be excluded in use of the copolymer for ion exchange in a chloralkali cell. The most preferred polymers are free of both hydrogen and chlorine attached to carbon, i.e., they are perfluorinated, for greatest stability in harsh environments. The T radical of the formula above can be either branched or unbranched, i.e., straight-chain, and can have one or more ether linkages. It is preferred that the vinyl radical in this group of sulfonyl fluoride containing comonomers be joined to the T group through an ether linkage, i.e., that the comonomer be of the formula $CF_2=CF-O-T-CF_2-SO_2F$. Illustrative of such sulfonyl fluoride containing comonomers are $CF_2=CFOCF_2CF_2SO_2F$, The most preferred sulfonyl fluoride containing comonomer is perfluoro(3,6-dioxa-4-methyl-7-octenesulfonyl fluoride), The sulfonyl-containing monomers are disclosed in such references as U.S. Pat. Nos. 3,282,875, 3,041,317, 3,718,627 and 3,560,568.

A preferred class of such polymers is represented by polymers having the repeating units wherein
m is 3 to 15,
n is 1 to 10,
p is 0, 1 or 2,
the X's taken together are four fluorines or three fluorines and one chlorine,
Y is F or $CF_3$, and
$R_f$ is F, Cl or a $C_1$ to $C_{10}$ perfluoroalkyl radical.

A most preferred copolymer is a copolymer of tetrafluoroethylene and perfluoro(3,6-dioxa-4-methyl-7-octenesulfonyl fluoride) which comprises 20 to 65 percent, preferably, 25 to 50 percent by weight of the latter.

When used in a film or membrane to separate the anode and cathode compartments of an electrolysis cell, such as a chloralkali cell, the polymer after conversion to ionizable form should have a total ion exchange capacity of 0.5 to 1.6 meq/g (milliequivalents/gram), preferably from 0.8 to 1.2 meq/g. Below an ion exchange capacity of 0.5 meq/g, the electrical resistivity becomes too high, and above 1.6 meq/g the mechanical properties are poor because of excessive swelling of the polymer. The values of m and n in the above formula of the copolymer should be adjusted or chosen such that the polymer has an equivalent weight no greater than about 2000, preferably no greater than about 1600, for use as an ion exchange barrier in an electrolytic cell. The equivalent weight above which the resistance of a film or membrane becomes too high for practical use in an electrolytic cell varies somewhat with the thickness of the film or membrane. For thinner films and membranes, equivalent weights up to about 2000 can be tolerated. For most purposes, however, and for films of ordinary thickness, a value no greater than about 1600 is preferred.

Such copolymers used in the present invention can be prepared by general polymerization techniques developed for homo- and copolymerizations of fluorinated ethylenes, particularly those employed for tetrafluoroethylene which are described in the literature. Nonaqueous techniques for preparing the copolymers include that of U.S. Pat. No. 3,041,317, that is, by the polymerization of a mixture of the major monomer therein, such as tetrafluoroethylene, and a fluorinated ethylene containing a sulfonyl fluoride group in the presence of a free radical initiator, preferably a perfluorocarbon peroxide or azo compound, at a temperature in the range 0°-200° C. and at pressures in the range 1-200 or more atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like, and inert, liquid chlorofluorocarbons such as 1,1,2-trichloro-1,2,2-trifluoroethane, and the like.

Aqueous techniques for preparing the copolymer include contacting the monomers with an aqueous medium containing a free-radical initiator to obtain a slurry of polymer particles in non-water-wet or granular form, as disclosed in U.S. Pat. No. 2,393,967, or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. Nos. 2,559,752 and 2,593,583.

The melt-fabricable polymer having carboxylic functional groups is typically a polymer having a fluorinated hydrocarbon backbone chain to which are attached the functional groups or pendant side chains which in turn carry the functional groups. The pendant side chains can contain, for example groups wherein Z is F or $CF_3$, t is 1 to 12, and W is —COOR or —CN, where R is lower alkyl. Ordinarily, the functional group in the side chains of the polymer will be present in terminal groups. Examples of fluorinated polymers of this kind are disclosed in British Pat. No. 1,145,445 and U.S. Pat. No. 3,506,635. More specifically, the polymers can be prepared from monomers which are fluorinated or fluorine substituted vinyl compounds. The polymers are usually made from at least two monomers. At least one monomer is a fluorinated vinyl compound from the first group described hereinabove in reference to polymers containing —$SO_2F$ groups. Additionally, at least one monomer is a fluorinated monomer which contains a group which can be hydrolyzed to a carboxylic acid group, e.g., a carboalkoxyl or nitrile group, in a side chain as set forth above. Again in this case, as in the case of the polymers having —$SO_2F$ groups, the monomers, with the exception of the R group in the —COOR, will preferably not contain hydrogen, especially if the polymer will be used in the electrolysis of brine, and for greatest stability in harsh environments, most preferably will be free of both hydrogen and chlorine, i.e., will be perfluorinated; the R group need not be fluorinated as it is lost during hydrolysis when the functional groups are converted to ion-exchange groups.

One exemplary suitable type of carboxyl-containing monomer is represented by the formula wherein
R is lower alkyl,
Y is F or $CF_3$, and
s is 0, 1 or 2.
Those monomers wherein s is 1 are preferred because their preparation and isolation in good yield is more easily accomplished than when s is 0 or 2. The compound pound is an especially useful monomer. Such monomer can be prepared, for example, from compounds having the formula wherein s and Y are as defined above, by (1) saturating the terminal vinyl group with chlorine to protect it in subsequent steps by converting it to a $CF_2Cl$—$CFCl$- group; (2) oxidation with nitrogen dioxide to convert the —$OCF_2CF_2SO_2F$ group to an —$OCF_2COF$ group; (3) esterification with an alcohol such as methanol to form an —$OCF_2COOCH_3$ group; and (4) dechlorination with zinc dust to regenerate the terminal $CF_2$=$CF$— group. It is also possible to replace steps (2) and (3) of this sequence by the steps (a) reduction of the —$OCF_2CF_2SO_2F$ group to a sulfinic acid, —$OCF_2CF_2SO_2H$, or alkali metal or alkaline earth metal salt thereof by treatment with a sulfite salt or hydrazine; (b) oxidation of the sulfinic acid or salt thereof with oxygen or chromic acid, whereby —$OCF_2COOH$ groups or metal salts thereof are formed; and (c) esterification to —$OCF_2COOCH_3$ by known methods; this sequence is more fully described in U.S. Ser. No. 789,726 in the names of W. G. Grot, C. J. Molnar and P. R. Resnick, filed Apr. 20, 1977. Preparation of copolymers thereof is described in U.S. Ser. No. 789,727 in the names of C. J. Molnar and P. R. Resnick, filed Apr. 20, 1977.

Another exemplary suitable type of carboxyl-containing monomer is represented by the formula wherein
V is —COOR or —CN,
R is lower alkyl,
Y is F or $CF_3$,
Z is F or $CF_3$, and
s is 0, 1 or 2.
The most preferred monomers are those wherein V is —COOR wherein R is lower alkyl, generally $C_1$ to $C_5$, because of ease in polymerization and conversion to ionic form. Those monomers wherein s is 1 are also preferred because their preparation and isolation in good yield is more easily accomplished than when n is 0 or 2. Preparation of those monomers wherein V is —COOR where R is lower alkyl, and copolymers thereof, is described in U.S. Pat. No. 4,131,740. The compounds whose preparation is described therein, are especially useful monomers. Preparation of monomers wherein V is —CN is described in U.S. Pat. No. 3,852,326.

Yet another suitable type of carboxyl-containing monomer is that having a terminal —$O(CF_2)_v COOCH_3$ group where v is from 2 to 12, such as $CF_2$=$CF$—$O(CF_2)_3COOCH_3$ and $CF_2$=$CFOCF_2CF(CF_3)O(CF_2)_3COOCH_3$. Preparation of such monomers and copolymers thereof is described in Japanese Patent Publications Nos. 38586/77 and 28486/77, and in British Pat. No. 1,145,445.

Another class of carboxyl-containing polymers is represented by polymers having the repeating units wherein
q is 3 to 15,
r is 1 to 10,
s is 0, 1 or 2,
t is 1 to 12,
the X's taken together are four fluorines or three fluorines and one chlorine,
Y is F or $CF_3$,
Z is F or $CF_3$, and
R is lower alkyl.

The values and preferred values of the ion exchange capacity and equivalent weight of the carboxylic containing copolymer should be in the same ranges as set forth above for copolymers containing sulfonyl groups in ionizable form. Similarly, the same polymerization techniques as set forth above are also suitable.

A copolymer which contains different types of functional groups can also be used as one of the component films in making the membrane of the invention. For example, a terpolymer prepared from a monomer chosen from the first group described above, a monomer from the second group described above, and additionally a monomer of the carboxylic type from the third group described above can be prepared and used as one of the film components in making the membrane.

It is further possible to use as one of the component films of the membrane a film which is a blend of two or more polymers. For example, a blend of a polymer having sulfonyl groups in melt-fabricable form with a polymer having carboxyl groups in melt-fabricable form can be prepared and used as one of the component films of the membrane of this invention.

It is additionally possible to use a laminar film as one of the component films in making the membrane. For example, a film having a layer of a copolymer having sulfonyl groups in melt-fabricable form and a layer of a copolymer having carboxyl groups in melt-fabricable form, can also be used as one of the component films in making the membrane of the invention.

In the process of the invention, temperatures of about 240° C. to 320° C. are ordinarily required to fuse the polymer films employed, so as to form a unitary membrane structure with the support material, and, when more than two films are used, to make adjacent sheets of film fuse together; the temperature required may be even above or below this range, however, and will depend on the specific polymer or polymers used. Actual heater temperatures as measured by a thermocouple in the heater itself will be higher than the indicated film temperature, due to heat losses; heater temperatures will vary with the type of heater, its placement, etc., and will generally fall in the range of 350° to 500° C. In the apparatus described herein, heater temperatures of 400° to 475° C. have been found suitable for making many membranes. The choice of a suitable temperature in any specific case will be clear, inasmuch as too low a temperature will fail to effect an adequate degree of adherence of the films to the reinforcement member and to each other, and too high a temperature will cause gas bubbles to form between or within the polymer films in the window areas and will cause the films to sag and form nonuniform layers.

The reinforcement fabric for encapsulation within the membrane is suitably a woven or nonwoven fabric. Woven fabrics include those of ordinary weave, and warp knit fabrics. A woven fabric is preferred for a membrane to be used in an electrolysis cell. Fabrics prepared from either monofilament or from multistranded yarns can be used. The fabric should be able to withstand a temperature from about 240° C. to about 320° C., since these temperatures are employed in the laminating steps. With this proviso, the individual reinforcing fibers can be made from conventional materials, since their main purpose is to strengthen the membrane. Due to chemical inertness, reinforcement materials made from prefluorinated polymers have been found to be preferred. The polymers include those made from tetrafluoroethylene and copolymers of tetrafluoroethylene with hexafluoropropylene and perfluoro(alkyl vinyl ethers) with alkyl being 1 to 10 carbon atoms such as perfluoro (propyl vinyl ether). An example of a most preferred reinforcement material is polytetrafluoroethylene. Supporting fibers made from chlorotrifluoroethylene polymers are also useful. Other suitable reinforcing materials include quartz and glass. Such reinforcement materials and their use to strengthen polymers in a membrane are well known in the prior art.

Other reinforcing members in sheet-like form can also be used in the process of the invention. These include various metals and alloys such as stainless steel and titanium in the form of screen or expanded mesh, sheets of perhalogenated polymers such as polytetrafluoroethylene in the form of expanded mesh, fabric of graphite fibers, netting of various polymers such as polypropylene or oriented polyethylene, and fiberglass. Such sheet-like member can be large or small in its dimensions, and following preparation of the article having two sheets of a fluorinated polymer, said polymer having sulfonyl groups in melt fabricable form, adhered to opposite sides of such reinforcing member, it can be in flat form or cut and/or shaped into other desirable forms such as small cylinders or saddles, or merely rolled into spiral form for insertion into a reactor such as a tube or column. Especially when shaping into such forms is desirable, support members having some degree of stiffness are desirable. After hydrolysis of the sulfonyl groups to sulfonate groups with a base and subsequent acidification to form sulfonic acid groups, articles of this kind are useful as a catalyst for catalyzing any chemical reaction catalyzed by hydrogen ion or a strong acid, e.g., alkylation of aromatic compounds such as the reaction of benzene and ethylene at 160° C. to form ethylbenzene. Said hydrolysis with a base and acidification to form sulfonic acid groups can be carried out either before or after said cutting, shaping into desirable forms, or rolling into spiral form. For preparation of such articles with the process and apparatus disclosed herein, the reinforcing member can be of any configuration so long as air can be removed from between the two films and from within the reinforcing member through the edge-conveyor belts. Any reinforcing member having raised portions on its surface, on either a macroscopic of microscopic scale, is suitable. For example, such members can be porous, or have an open-cell structure. Sheets which are nonporous in the thickness direction, but which have surface roughness in a random or repeating pattern such as projections or furrows, so long as the air can be removed from between the two films, can also be used as the reinforcement. The fluorinated polymer having sulfonyl groups used in articles used as a catalyst is preferably a perfluorinated polymer. Catalysts made by the process disclosed herein make highly efficient use of the polymer by virtue of the polymer being largely in the form of a uniform thin layer.

For use in ion exchange applications and in cells, for example a chloralkali cell for electrolysis of brine, the membrane should have all of the functional groups converted to ionizable functional groups. Ordinarily and preferably these will be sulfonic acid and carboxylic acid groups, or alkali metal salts thereof. Such conversion is ordinarily and conveniently accomplished by hydrolysis with acid or base, such that the various functional groups described above in relation to the melt-fabricable polymers are converted respectively to the free acids or the alkali metal salts thereof. Such hydrolysis can be carried out with an aqueous solution of a mineral acid or an alkali metal hydroxide. Base hydrolysis is preferred as it is faster and more complete. Use of hot solutions, such as near the boiling point of the solution, is preferred for rapid hydrolysis. The time required for hydrolysis increases with the thickness of the structure. It is also of advantage to include a water-miscible organic compound such as dimethylsulfoxide in the hydrolysis bath.

Before carrying out the hydrolysis described in the previous paragraph, it is also possible to chemically modify one surface of the membrane by means other than hydrolysis. This can be especially desirable in the case of a membrane all of whose component films are prepared from polymers which contain sulfonyl functional groups and which is intended to be used in a chloralkali cell. In such a case, it is possible to treat one surface of the membrane whose functional groups are still in sulfonyl fluoride or sulfonyl chloride form with a mono- or polyfunctional amine, such as butylamine or ethylenediamine. Such techniques are described in, for example, U.S. Pat. Nos. 4,085,071 and 3,969,285. Following amine treatment the membrane is then subjected to a hydrolysis treatment such as that described in the paragraph immediately above.

The various copolymers used in the blends described herein should be of high enough molecular weight to produce tough films in both the melt-fabricable precursor form and in the hydrolyzed ion-exchange form.

To further illustrate the innovative aspects of the present invention, the following examples are provided.

EXAMPLE 1

A membrane of symmetrical cross-section was prepared on apparatus as described hereinabove as follows.

A fabric woven from perfluorocarbon polymer monofilaments were encapsulated between a pair of similar films of fluorinated polymer containing sulfonyl groups. The films were each of a copolymer of perfluoro(3,6-dioxa-4-methyl-7-octenesulfonyl fluoride) and tetrafluoroethylene having an equivalent weight of 1150 and of an equal thickness of 2 mils (51 micrometers). The fabric was woven from perfluorocarbon polymer monofilament of 200 denier (0.005 inches diameter, or 0.127 mm) having a thread count of 34–38 per inch (13–15 per cm) in the warp direction and 17–18 per inch (6–7 per cm) in the fill or weft direction.

During lamination the films and fabric forming the web were passed between chevron-shaped heater plates, each of 6 inch (0.15 meter) effective heated length maintained at 460° C. (heater temperature measured by thermocouple) at a rate of 12 inches/minute ($5.08 \times 10^{-3}$ meters/sec.). The amount of vacuum applied at the fabric edges through the perforated edge-conveyor belt was 26.5 inches of mercury below atmospheric pressure, or $11.5 \times 10^3$ Pa absolute pressure.

This laminate was then subjected to a posttreatment with a solution of ethylene diamine on one face only so as to form a catholyte barrier layer to enhance its efficiency when used as an ion-exchange membrane in a chlor-alkali cell. The treating solution contained 20 ml of ethylene diamine in 80 ml of dimethylsulfoxide which had previously been dried over a molecular sieve of 4 A (Angstrom) size. The membrane was treated for 90 minutes at room temperature in this solution. The depth of treatment penetration was 0.3 mils (7.5 microns) as measured by staining a cross-section of the membrane with Merpacyl orange R dye which showed up the modified surface layer.

After water-washing and hydrolysis, the membrane was tested in a chlor-alkali cell for 54 days of continuous operation. The average voltage observed was 3.85 volts at an average current efficiency of 90%, equivalent to a power consumption of 2857 KW-hr/metric ton of NaOH when producing NaOH of 29% concentration at a current density of 31 amps/decimeter$^2$(2 ASI). Other test conditions were as follows: the inlet brine (less than 0.1 ppm calcium) was saturated and the rate was adjusted to yield an exit brine concentration of 240 gms/liter. Anolyte temperature was 80° C.

EXAMPLE 2

The same apparatus and reinforcement fabric were used as in Example 1. To one side of the fabric was applied a 51-micrometer (2-mil) film of a copolymer of perfluoro(3,6-dioxa-4-methyl-7-octenesulfonyl fluoride) and tetrafluoroethylene having an equivalent weight of 1100. To the other side of the fabric was applied a pair of pre-blocked films as follows: one film was a 51-micrometer film as just described and the other film was a 25-micrometer (1-mil) film of a melt extruded blend of 75% by wt. of a copolymer of methyl perfluoro(4,7-dioxa-5-methyl-8-nonenoate) and tetrafluoroethylene having an equivalent weight of 1050 and 25% by wt. of a copolymer of perfluoro(3,6-dioxa-4-methyl-7-octenesulfonyl fluoride) and tetrafluoroethylene having an equivalent weight of 1100; the films were pre-blocked by passing them simultaneously between a pair of nip-rolls to press them together, each film being separately trained around the periphery of its respective nip-roll so that the films did not touch until the nip was reached, so as to achieve a rolling wedge effect which precludes entrainment of air between the films, because any entrained air would lead to formation of bubbled, deformed areas during formation of the membrane as a result of expansion of the air during heating, the resulting blocked "bi-film" was used in formation of the membrane with the sulfonyl fluoride film placed against the reinforcing fabric. During lamination, the chevron-shaped heaters at the side having the 7.6-micrometer "bi-film" were maintained at 440° C., and on the other side at 420° C. (both heater temperatures measured by thermocouple), the line speed was 5.1 mm/sec, and the vacuum at the edge conveyors was 27.5 inches of mercury below atmospheric pressure (8.2 KPa absolute pressure). The resultant laminate was hydrolyzed in a caustic solution and then tested in a chloralkali cell. After 15 days of continuous operation, the voltage was 3.68 volts, and the current efficiency 98.7%, while producing 30-32% NaOH at 31 amps/decimeter$^2$ at 80° C., with an NaCl exit brine concentration of 230-235 gm/liter, and an anolyte pH of 4.2.

Example 3

A membrane was prepared by laminating a 0.051-mm (2-mil) film of a copolymer of methyl perfluoro(4,7-dioxa-5-methyl-8-nonenoate) and tetrafluoroethylene having an equivalent weight of 1050 to each side of the same reinforcement fabric as described in Example 1. Lamination was carried out in the same apparatus at a line speed of 5.1 mm/sec with the heaters in each bank at 400° C., and at a vacuum at the edge conveyors of 24 inches of mercury below atmospheric pressure (20.10$^3$ Pa absolute pressure). After hydrolysis of the resulting membrane to the carboxylate potassium salt form, it was tested in a chloralkali cell under the standard operating conditions as detailed in Example 2, and a voltage of 4.06 volts was observed at 98.3% current efficiency after 26 days of continuous operation.

EXAMPLE 4

A membrane was prepared by laminating a 0.025-mm (1-mil) film a melt-extruded blend of 75% by wt. of a copolymer of methyl perfluoro(4,7-dioxa-5-methyl-8-nonenoate) and tetrafluoroethylene having an equivalent weight of 1050 and 25% by wt. of a copolymer of perfluoro(3,6-dioxa-4-methyl-7-octenesulfonyl fluoride) and tetrafluoroethylene having an equivalent weight of 1100 to each side of the same reinforcement fabric as described in Example 1. Lamination was carried out in the same apparatus at a line speed of 5.1 mm/sec with the heaters in each bank at 420° C., and at a vacuum at the edge conveyors of 27 inches of mercury below atmosphereic pressure (9.9 × 10$^3$ Pa absolute pressure). After hydrolysis, this membrane was tested in a chloralkali cell under the standard conditions of Example 2, and a voltage of 3.66 volts at 94.1% current efficiency was observed after 14 days of continuous operation.

EXAMPLE 5

In the apparatus of Example 1, two 0.051-mm (2-mil) films of a copolymer of perfluoro(3,6-dioxa-4-methyl-7-octenesulfonyl fluoride) and tetrafluoroethylene having an equivalent weight of 1100 were brought into contact with a non-woven uncalendered expanded sheet of titanium metal (titanium sheet having a thickness of 2.8 mils, or 0.071 mm, expanded to have openings 9.8 mils, or 2.48 mm, by 4.9 mils, or 1.245 mm), one film on each side thereof. The chevron heaters were set at 475° C., and a line speed of 24 inches per minute (10.16 × 10$^{-3}$ m/sec.) and vacuum at the edge conveyors of 24 inches of mercury below atmospheric pressure (20 × 10$^3$ Pa absolute pressure) were used. The expanded metal web provides a relatively stiff support member for the films, and following hydrolysis of the sulfonyl fluoride groups to sulfonate groups with a caustic solution and subsequent acidification to form sulfonic acid groups, the article so prepared, or after subsequent cutting and/or shpaing, is useful as a catalyst for various chemical reactions.

INDUSTRIAL APPLICABILITY

With the process and apparatus described, ion exchange membranes having general utility for ion exchange purposes are prepared. Such includes selection permeation or absorption of cations, and reverse osmosis.

A specific use for the membranes is in a chloralkali cell such as disclosed in German patent application Ser. No. 2,251,660 published Apr. 26, 1973, and Netherlands patent application No. 72.17598 published June 29, 1973. In a manner similar to that disclosed therein, a conventional chloralkali cell is employed with the distinction of using the novel membrane described herein to separate the anode and cathode portions of the cell.

The web supported membrane of the present invention possesses numerous technical advantages over previously known membranes. This membrane possesses exeptional uniformity. The warp and fill strands of the support fabric are well covered on both sides of the membrane by polymer. Prior art membranes made with thin layers of fluorinated polymer invariably had either bare junctions or junctions covered by only a thin polymer layer, and were thus vulnerable to abrasion and exposure of the junctions of the strands; this invariably led to rupture of the membrane and a short useful life. In the present membrane, the strands and the junctions are well covered by polymer on both sides and thus have greater resistance to abrasion and a longer useful life. Furthermore, the greater uniformity of polymer filling the window areas of the fabric, and the consequent substantial elimination of window areas having only a thin layer of polymer therein, results in the elimination of nonuniform current gradients which lead to more rapid deposition of calcium impurities in the thin areas, which in turn leads to rupture of the thin areas and short membrane life. Additionally, the greater uniformity of the surface contours of the membrane of this invention and the elimination of deep recesses in the window areas substantially reduces the tendency for gas blinding of membrane during use in a chloralkali cell. Accordingly, the total thickness of the polymeric material can be substantially reduced over prior art membranes, with consequent improvement in efficiency and reduction of voltage when employed in electrolytic processes such as the chloroalkali process. Additionally, the membranes of the invention perform well during chloralkali electrolysis when used under conditions of high depletion of the feed brine. Furthermore, the surface hydrolysis step of the prior art process for making membranes is eliminated. Also, the process eliminates the step of stripping a membrane from a laminating drum or other support surface which in many cases led to a membrane having one surface textured or embossed by the pattern of the support surface.

I claim:

1. A process for continuously forming a reinforced membrane comprising
   (1) continuously bringing at least two films of melt-fabricable fluorinated polymer which contain side chains containing sulfonyl and/or carboxyl functional groups in melt fabricable form and a web of reinforcing material into face-to-face contact such that proximate surfaces of two of said films contact opposite planar surfaces of said web, and moving the resulting combination of said films and said web vertically, unsupported except at two opposite edges thereof, (2) applying vacuum to said combination at only the two opposite edge portions thereof, whereby air is removed from between said films, (3) applying heat to the two outermost opposite planar film surfaces, first in the center portions thereof and progressively moving toward and including the edge portions thereof, and (4) cooling the resulting reinforced membrane.

2. The process of claim 1 wherein said reinforcing material is a fabric comprising strands of fluorinated polymer.

3. The process of claim 2 wherein said heat is radiant heat.

4. The process of claim 3 wherein said combination of films and web is moved vertically upward as heat is applied.

5. The process of claim 1 wherein two films of substantially equal thickness are used.

6. The process of claim 1 wherein two films of different thickness are used.

7. The process of claim 1 wherein three films are used, the two films on one side of said reinforcing material having substantially the same total thickness as the one film on the other side of said reinforcing material.

8. The process of claim 1 wherein three films are used, the two films on one side of said reinforcing material having a different total thickness than the one film on the other side of said reinforcing material.

9. The process of claim 5, 6, 7 or 8 wherein heat is applied equally to the two outermost opposite planar film surfaces.

10. The process of claim 5, 6, 7 or 8 wherein heat is applied unequally to the two outermost opposite planar film surfaces.

* * * * *